(12) United States Patent
Yokoi

(10) Patent No.: US 8,471,218 B2
(45) Date of Patent: Jun. 25, 2013

(54) DETECTING DEVICE AND OPTICAL APPARATUS INCLUDING THE DETECTING DEVICE

(75) Inventor: Eiji Yokoi, Tokyo (JP)

(73) Assignee: Olympus Corporation, Tokyo (JP)

( * ) Notice: Subject to any disclaimer, the term of this patent is extended or adjusted under 35 U.S.C. 154(b) by 343 days.

(21) Appl. No.: 12/874,451

(22) Filed: Sep. 2, 2010

(65) Prior Publication Data

US 2011/0057113 A1    Mar. 10, 2011

(30) Foreign Application Priority Data

Sep. 10, 2009  (JP) ................................. 2009-208936

(51) Int. Cl.
*G01N 21/64* (2006.01)
(52) U.S. Cl.
USPC ...................................... 250/458.1
(58) Field of Classification Search
USPC .................. 356/310; 359/889; 250/458.1
See application file for complete search history.

(56) References Cited

U.S. PATENT DOCUMENTS

| | | | | |
|---|---|---|---|---|
| 5,576,897 A | * | 11/1996 | Kuo | 359/822 |
| 5,998,796 A | * | 12/1999 | Liu et al. | 250/458.1 |
| 2009/0059406 A1 | * | 3/2009 | Powers et al. | 359/889 |

FOREIGN PATENT DOCUMENTS

| JP | 2004-341204 A | 12/2004 |
|---|---|---|
| JP | 2006-125970 A | 5/2006 |

OTHER PUBLICATIONS

Machine Translation for JP 2006-125970 A downloaded Oct. 2, 2012.*
V. Nikolenko et al; SLM Microscopy: Scanless Two-Photon Imaging and Photostimulation With Spatial Light Modulators; Frontiers in Neural Circuits; vol. 2, Dec. 2008.

* cited by examiner

*Primary Examiner* — Constantine Hannaher
(74) *Attorney, Agent, or Firm* — Holtz, Holtz, Goodman & Chick, P.C.

(57) ABSTRACT

A detecting device includes a wavelength dispersion element for dispersing light into wavelengths and for emitting dispersed light, a photodetector for detecting the dispersed light, and a wavelength restriction element, which is arranged between the wavelength dispersion element and the photodetector and has an optical characteristic dependent on a wavelength, for restricting an incidence of light having a particular wavelength to the photodetector. Light that is part of the dispersed light and includes the light having has the particular wavelength is incident to the wavelength restriction element.

21 Claims, 9 Drawing Sheets

DETECTING DEVICE AND OPTICAL APPARATUS INCLUDING THE DETECTING DEVICE

CROSS REFERENCE TO RELATED APPLICATIONS

This application is based upon and claims the benefit of priority from the prior Japanese Patent Application No. 2009-208936, filed Sep. 10, 2009, the entire contents of which are incorporated herein by this reference.

BACKGROUND OF THE INVENTION

1. Field of the Invention

The present invention relates to a technique of a detecting device for detecting light to be detected by rejecting light having an unnecessary wavelength, and of an optical apparatus including the detecting device.

2. Description of the Related Art

A fluorescence observation is widely known as one of sample observing methods. A fluorescence observation is an observation method for observing a sample by illuminating excitation light on the sample dyed with a fluorescent substance, and by detecting fluorescence light generated from the fluorescent substance with a photodetector.

Normally, fluorescence light generated from a fluorescent substance is much weaker than excitation light needed to excite the fluorescent substance. Therefore, the following two points are vital in a fluorescence observation. [a] Detecting as much fluorescence light as possible with a photodetector. [b] Sufficiently rejecting excitation light before the excitation light reflected on a sample or an optical element on an optical path is incident to a photodetector.

A conventional fluorescence microscope used for a fluorescence observation separates fluorescence light and excitation light by using an optical filter such as an absorption filter or the like in addition to a dichroic mirror. Normally, a fluorescence wavelength and an excitation wavelength are relatively close. Therefore, to sufficiently attenuate excitation light while efficiently transmitting fluorescence light, a transmittance characteristic having a steep rise or fall for a wavelength (simply referred to as a steep transmittance characteristic hereinafter) is demanded for an optical filter. However, it is difficult to design an optical filter having such a steep characteristic, and a trade-off exists between a transmission of fluorescence light and rejection of excitation light. This trade-off becomes more noticeable if an optical filter is designed to attenuate a plurality of excitation light beams having different excitation wavelengths.

In light of the above described circumstances, a technique of rejecting excitation light by using a diffraction grating and a light-shielding plate as a replacement for an optical filter is disclosed by Japanese Laid-open Patent Publication No. 2006-125970.

According to Japanese Laid-open Patent Publication No. 2006-125970, incident light is refracted in different directions for respective wavelengths by using a diffraction grating. Consequently, light emitted from the diffraction grating results in dispersed light where component light beams having different wavelengths are arranged in order of the wavelengths. By arranging a light-shielding plate in a region through which component light having an excitation wavelength passes, the excitation light can be shielded. Since the light-shielding plate is configured to be movable, it can also cope with a change in a refractive grating or a change in an excitation wavelength.

To reject excitation light without shielding fluorescence light by using the technique disclosed by Japanese Laid-open Patent Publication No. 2006-125970, it is preferable to arrange the light-shielding plate only in a region through which component light having an excitation wavelength passes. It is also preferable to reduce the size of the light-shielding plate to a minimum needed to shield the component light having the excitation wavelength. The reason is to prevent component light (fluorescence light) having a wavelength different from the excitation wavelength from being shielded by the light-shielding plate.

SUMMARY OF THE INVENTION

A first aspect of the present invention provides a detecting device including: a wavelength dispersion element for dispersing light into wavelengths, and for emitting dispersed light; a photodetector for detecting the dispersed light; and a wavelength restriction element, which is arranged between the wavelength dispersion element and the photodetector and has an optical characteristic dependent on a wavelength, for restricting an incidence of light having a particular wavelength to the photodetector, wherein light that is part of the dispersed light and includes light having the particular wavelength is incident to the wavelength restriction element.

Another aspect of the present invention provides an optical apparatus including: a light source for illuminating a sample; and the detecting device according to the first aspect for detecting light emitted from the sample, wherein a wavelength of illumination light illuminated on the sample matches a particular wavelength.

BRIEF DESCRIPTION OF THE DRAWINGS

The present invention will be more apparent from the following detailed description when the accompanying drawings are referenced.

DESCRIPTION OF THE PREFERRED EMBODIMENTS

First Embodiment

A first embodiment is described below with reference to the drawings.

Figure 1:
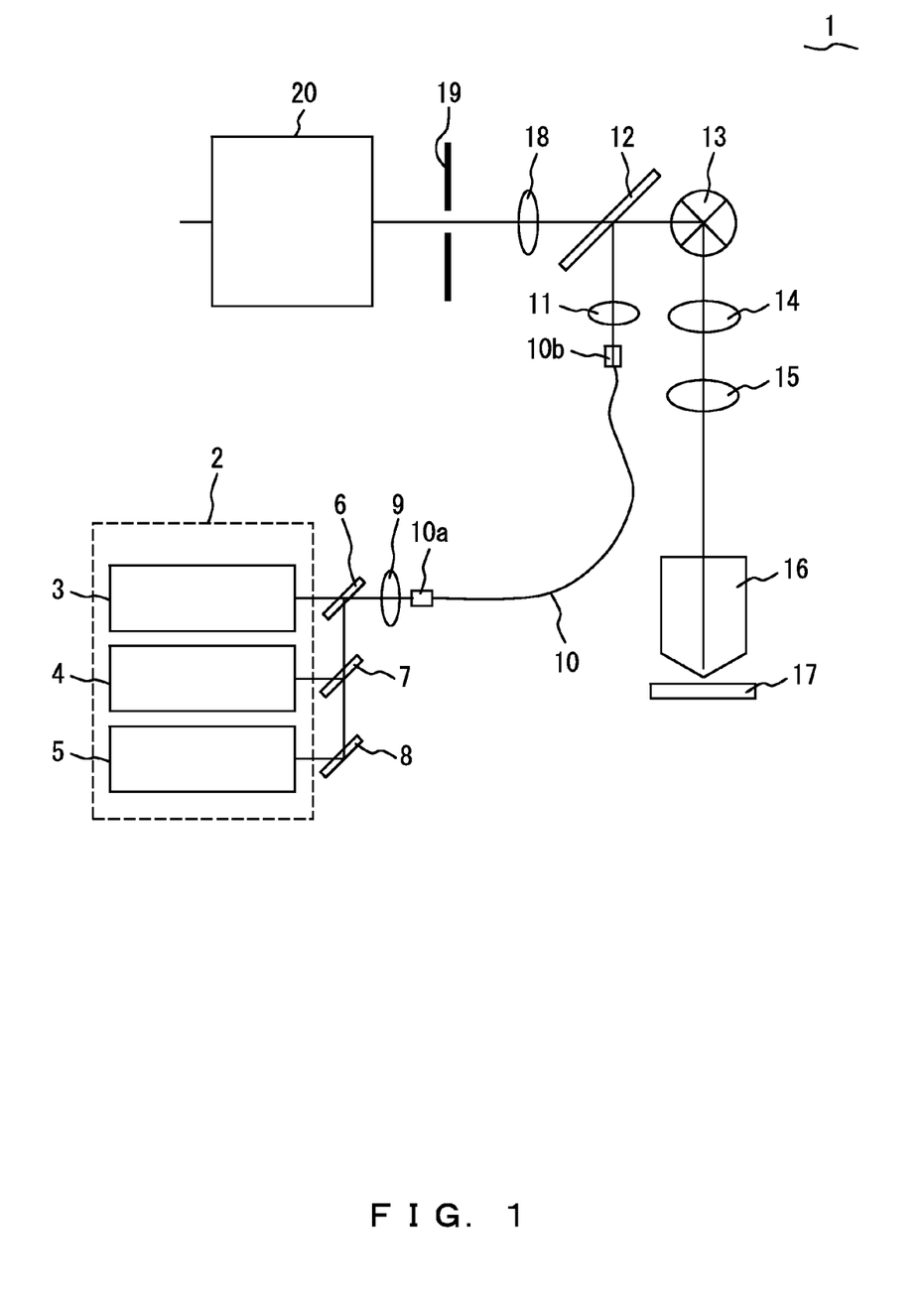
FIG. 1 is a schematic diagram illustrating a configuration of an optical apparatus according to a first embodiment.

FIG. 1 is a schematic diagram illustrating a configuration of an optical apparatus according to the first embodiment. The optical apparatus 1 illustrated in FIG. 1 is a confocal laser scanning microscope for observing a specimen 17 (sample) dyed with a fluorescent substance. Specifically, the optical apparatus 1 is configured by including a light source 2 composed of a plurality of laser light sources for illuminating the specimen 17, a plurality of mirrors for guiding laser light beams emitted from the laser light sources to a coupling lens 9, the coupling lens 9, an optical fiber 10, a collimating lens 11, an excitation dichroic mirror 12, a scanning unit 13, a pupil relay lens 14, a tube lens 15, an objective lens 16, a collective lens 18, a confocal stop 19, and a detecting device 20 for detecting light emitted from the specimen 17.

The light source 2 is composed of laser light sources 3, 4 and 5 for respectively emitting laser light beams having different wavelengths. The laser light beams emitted from the laser light sources are excitation light beams that excite a fluorescent substance, and respectively have different excitation wavelengths.

In the light source 2, only any one or some of the laser light sources may be used. If some of the laser light sources are used, excitation light beams may be simultaneously emitted from the laser light sources, or the excitation light beams may be sequentially emitted from the laser light sources. Moreover, when the excitation light beams are sequentially emitted, a line sequential method for switching among the laser light sources for each line scanning with the scanning unit 13, or a frame sequential method for switching among the laser light sources after the scanning unit 13 terminates scanning by one frame may be available as a method for switching among the laser light sources for emitting excitation light beams.

Examples of the laser light sources include a semiconductor laser light source and a gas laser light source. Moreover, the light source 2 is not limited to a laser light source. For example, a lamp light source such as a mercury lamp, a xenon lamp or the like may be available as the light source 2. In this case, however, only light having a wavelength available as excitation light is extracted and used because light emitted from the lamp light source includes light beams having diverse wavelengths.

The excitation light beams emitted from the laser light sources are incident to the coupling lens 9. More specifically, the excitation light emitted from the laser light source 3 is incident to the coupling lens 9 after transmitting through the dichroic mirror 6. The excitation light emitted from the laser light source 4 is incident to the coupling lens 9 after being reflected on the dichroic mirrors 7 and 6. The excitation light emitted from the laser light source 5 is incident to the coupling lens 9 after being reflected on the mirror 8, transmitting through the dichroic mirror 7, and being reflected on the dichroic mirror 6.

The coupling lens 9 collects the excitation light beams emitted from the light source 2, and makes the collected light incident to an incidence end 10a of the optical fiber 10. The excitation light incident to the optical fiber 10 proceeds within the optical fiber 10, and is emitted from an emission end 10b of the optical fiber 10. Thereafter, the excitation light emitted from the optical fiber 10 is converted into collimated light by the collimating lens 11, and is incident to the excitation dichroic mirror 12.

The excitation dichroic mirror 12 is an optical element having a characteristic of reflecting excitation light and of transmitting fluorescence light. Therefore, the excitation light is reflected by the excitation dichroic mirror 12 in the direction of the scanning unit 13. The excitation dichroic mirror 12 may be configured, for example, with an exciter filter and a dichroic mirror.

The excitation light reflected on the excitation dichroic mirror 12 is incident to the objective lens 16 via the scanning unit 13, the pupil relay lens 14 and the tube lens 15. Then, the objective lens 16 collects the excitation light on the specimen 17, thereby illuminating the excitation light on the specimen 17.

On the specimen 17 illuminated with the excitation light, a fluorescent substance is excited to generate fluorescence light. The fluorescence light is incident to the objective lens 16, and is further incident to the excitation dichroic mirror 12 via the tube lens 15, the pupil relay lens 14 and the scanning unit 13.

Thereafter, the fluorescence light transmits through the excitation dichroic mirror 12, and is collected on the confocal stop 19 by the collective lens 18. The confocal stop 19 is provided with a pinhole for transmitting light. The position of the pinhole is optically conjugate with the focal position of the objective lens 16. As a result, fluorescence light from other than the focal position of the objective lens 16, namely, other than the light-collecting position on the specimen 17 is shielded by the confocal stop 19, and only the fluorescence light from the light-collecting position is incident to the detecting device 20.

As described above, the optical apparatus 1 is configured so that only the fluorescence light generated at the light-collecting position is incident to the detecting device 20. Accordingly, in the optical apparatus 1, the detecting device 20 detects fluorescence light beams from respective points on the specimen 17 by moving the light-collecting position on the specimen 17 with the scanning unit 13, and generates an image of the specimen 17. For example, a galvanometer mirror, a polygon mirror, an acousto-optic (hereinafter abbreviated to AO) element or the like is available as the scanning unit 13.

Only the fluorescence light generated from the specimen 17 has been focused above. Actually, however, also light beams other than the fluorescence light are incident to the detecting device 20. Specifically, light beams such as an excitation light beam reflected on the specimen 17 and an excitation light beam reflected on an optical element such as the objective lens 16 or the like are incident, and these light beams are unnecessary to observe the specimen 17.

It is preferable to completely reject such unnecessary excitation light beams with the excitation dichroic mirror 12. Since fluorescence light is much weaker than excitation light, information about the specimen 17, obtained by detecting fluorescence light, is significantly degraded if even a slight quantity of excitation light is mixed with the fluorescence light. However, it is very difficult to design an excitation dichroic mirror 12 having a characteristic that does not transmit excitation light at all.

Therefore, in the optical apparatus 1 according to this embodiment, the detecting device 20 is configured to prevent a detection quantity of light (fluorescence light) to be detected from being decreased, and to sufficiently reject light (excitation light) having a particular wavelength.

Figure 2A:
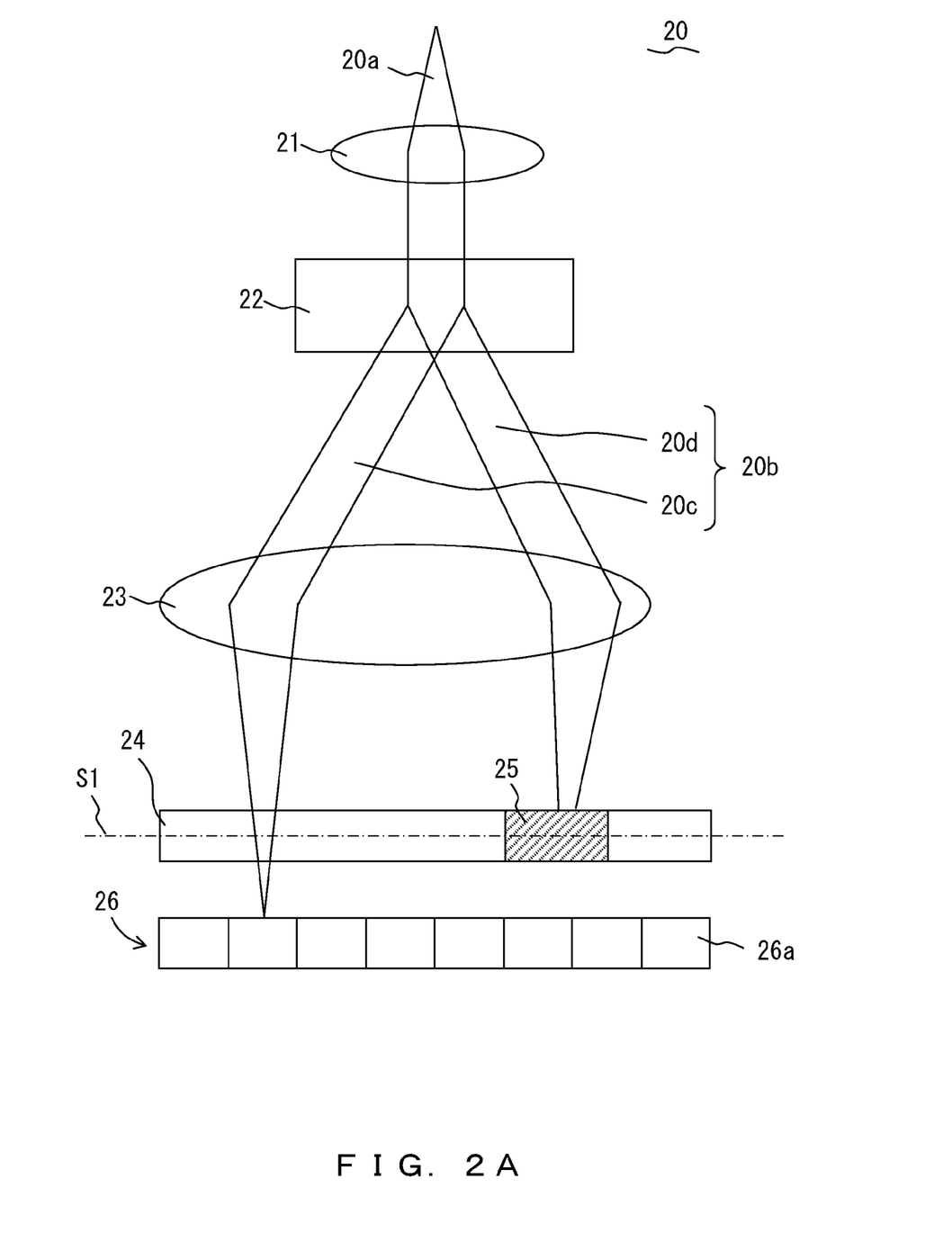
FIG. 2A is a schematic diagram illustrating a configuration of a detecting device according to the first embodiment.

The detecting device according to this embodiment is described below with reference to FIG. 2A. FIG. 2A is a schematic diagram illustrating a configuration of the detecting device according to this embodiment. For ease of explanation, a case where wavelengths included in light incident to the detecting device include one type of an excitation wavelength and a fluorescence wavelength included in fluorescence light emitted from one type of a fluorescent substance is taken as an example. The fluorescence light from one type of fluorescent substance has a relatively wide wavelength range, and includes also a wavelength close to the excitation wavelength. Accordingly, component light 20c having the fluorescence wavelength is actually distributed up to the vicinity of component light 20d having an excitation wavelength. However, only component light of one wavelength representing the wide wavelength region possessed by the fluorescence light is illustrated in FIG. 2A as the component light 20c having the fluorescence wavelength.

A configuration of the detecting device 20 illustrated in FIG. 2A is initially described.

The detecting device 20 is configured by including a collimating lens 21 for converting incident light into collimated light, a wavelength dispersion element 22 for dispersing incident light 20a into wavelengths and for emitting dispersed light 20b where light beams having different wavelengths (hereinafter referred to as component light beams) are arranged in order of the wavelengths, and a collective lens 23 for collecting the component light beams, a transparent substrate 24 for transmitting the dispersed light 20b, a wavelength restriction element 25 arranged on the substrate 24, and a photodetector 26 for detecting the dispersed light 20b.

For example, a diffraction grating or a prism is available as the wavelength dispersion element 22. Moreover, a reflection mirror is respectively available as a replacement for the collimating lens 21 and the collective lens 23.

The wavelength restriction element 25 is an optical element that has an optical characteristic dependent on a wavelength and restricts an incidence of light having a particular wavelength to the photodetector 26. The wavelength restriction element 25 is positioned between the wavelength dispersion element 22 and the photodetector 26. For example, an optical filter that has a transmittance dependent on a wavelength and sufficiently attenuates light having a particular wavelength is available as the wavelength restriction element 25. Moreover, a notch filter having a steep transmittance characteristic, a long wavelength pass filter or the like is available as the optical filter. Furthermore, an acousto-optic (AO) element or an electro-optic (EO) element may be available as the wavelength restriction element 25.

The description is provided hereinafter by taking, as an example, a case where the wavelength restriction element 25 is an optical filter designed so that its particular wavelength matches an excitation wavelength. In this case, the substrate 24 and the wavelength restriction element 25 function as a wavelength restriction unit for sufficiently restricting an incidence of light having an excitation wavelength within the dispersed light 20b to the photodetector 26.

The photodetector 26 is configured by including a plurality of photodetecting elements 26a. The plurality of photodetecting elements 26 are arranged in a wavelength dispersion direction of the dispersed light 20b incident to the photodetector 26. For example, a photomultiplier (PMT) or a charge coupled device (CCD) is available as the photodetecting elements 26a.

The photodetector of a so-called multi-channel type including the plurality of photodetecting elements 26 is described as an example. However, the photodetector 26 is not limited to this one. A photodetector of a single channel type may be available.

Actions of the detecting device 20 are briefly described.

Incident light 20a that includes fluorescence light and excitation light and is incident to the detecting device 20 is converted into collimated light by the collimating lens 21, and the collimated light is incident to the wavelength dispersion element 22. The wavelength dispersion element 22 disperses the incident light 20a into wavelengths, emits dispersed light 20b where the component light 20c of the fluorescence wavelength and the component light 20d of the excitation wavelength are arranged in order of the wavelengths, and makes the dispersed light 20b incident to the collective lens 23. The component light beams emitted from the wavelength dispersion element 22 are collimated light beams, respectively.

The component light 20c of the fluorescence wavelength is converted into converged light by the collective lens 23. Thereafter, the component light 20c transmits through the substrate 24 arranged on a plane S1 between the wavelength dispersion element 22 and the photodetector 26, and is collected on the photodetecting element 26a of the photodetector 26. Since the substrate 24 is transparent to the dispersed light 20b, it is also transparent to the component light 20c. Accordingly, the component light 20c is incident to the photodetector 26 with almost no decrease in its light quantity.

Figure 2B:
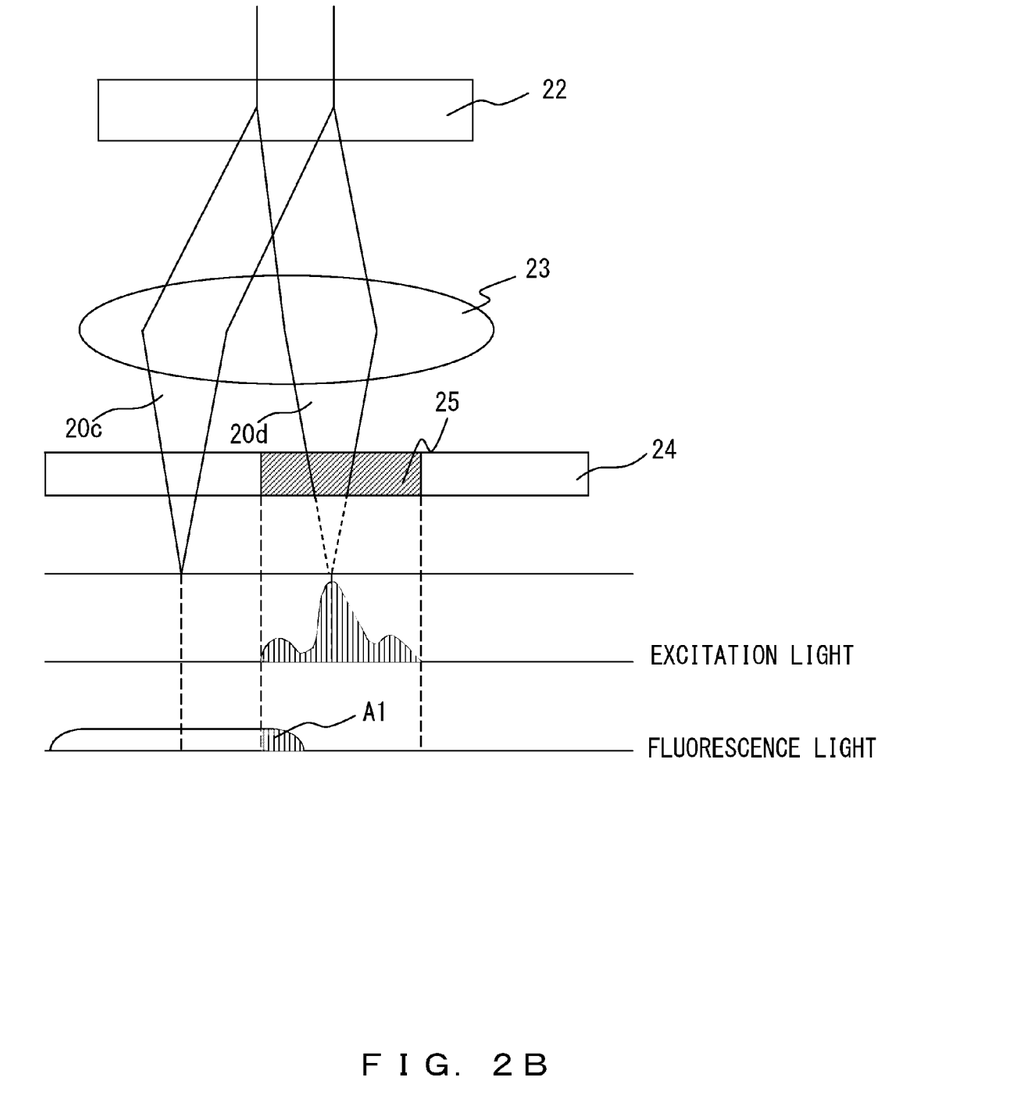
FIG. 2B is an explanatory view of spatial widening of component light of excitation light and that of fluorescence light.

In FIG. 2A, only the component light of one wavelength that represents a wide wavelength region possessed by fluorescence light is illustrated as the component light 20c of the fluorescence wavelength. Normally, however, the wavelength range of excitation light is extremely narrow, whereas that of fluorescence light is relatively wide and includes also a wavelength close to the excitation wavelength. Accordingly, the fluorescence light actually has a wavelength range including a wavelength close to the excitation wavelength as illustrated in FIG. 2B. Therefore, the component light 20c of the fluorescence wavelength is distributed up to the vicinity of the component light 20d of the excitation wavelength. Moreover, light cannot be collected at one point due to an influence of diffraction. Therefore, each component light beam is always distributed with some width in space. Considering such widening caused by the diffraction of the component light beams 20c and 20d, part of the component light 20c of the fluorescence wavelength is actually distributed with an overlap with the component light 20d of the excitation wavelength (see an overlapping portion A1 of FIG. 2B) as illustrated in FIG. 2B.

In the meantime, the component light 20d of the excitation wavelength is converted into converged light by the collective lens 23. Thereafter, the component light 20d is incident to the wavelength restriction element 25 arranged between the collective lens 23 and the photodetector 26. Since the wavelength restriction element 25 restricts an incidence of light having a particular wavelength to the photodetector 26, almost no component light 20d of the excitation wavelength, which matches the particular wavelength, is incident to the photodetector 26, and is rejected.

Also part of the component light 20c of the fluorescence wavelength distributed with the overlap with the component light 20d of the excitation wavelength is incident to the wavelength restriction element 25. However, since the fluorescence wavelength is different from the excitation wavelength, a transmission of part of the component light 20c of the fluorescence wavelength is not restricted when being incident to the wavelength restriction element 25, and the part of the component light 20c is incident to the photodetector 26 with almost no decrease in its light quantity. This point is different from the configuration using a conventional light-shielding plate that shields part of component light of a fluorescence wavelength distributed with an overlap with component light of an excitation wavelength.

Hereinafter, the reason why the detecting device 20 can sufficiently reject excitation light (the component light 20$d$ of the excitation wavelength) with the wavelength restriction element 25 is further described in detail by focusing an arrangement and an optical characteristic of the wavelength restriction element 25.

To sufficiently reject excitation light, the following two points are important. [1] The wavelength restriction element 25 is arranged to act on the entire excitation light. [2] The wavelength restriction element 25 has a transmittance characteristic of sufficiently attenuating excitation light.

[1] is initially discussed.

In the detecting device 20, the incident light 20$a$ is converted into dispersed light 20$b$ by the wavelength dispersion element 22. The dispersed light is a set of component light beams arranged in order of wavelengths. All excitation light beams included in the incident light 20$a$ pass through a certain region on the plane S1 as the component light 20$d$ of the excitation wavelength. Moreover, if specifications of the wavelength dispersion element 22 and other optical elements are determined, a relationship between a region on the plane S1 and a wavelength of light that can be incident to that region is known. Therefore, also the region on the plane S1, to which the component light 20$d$ of the excitation wavelength is incident, is evident.

Accordingly, in the detecting device 20, there is no need to provide the wavelength restriction element 25 in the entire region to which the dispersed light 20$b$ is incident. The wavelength restriction element 25 can be made to act on all excitation light beams by being arranged in the region to which part of the dispersed light 20$b$ including the component light 20$d$ of the excitation wavelength is incident as illustrated in FIG. 2A.

From the viewpoint of suppressing actions on component light beams of wavelengths different from the excitation wavelength, it is preferable that the size of the wavelength restriction element 25 is as small as possible in the wavelength dispersion direction. However, considering the widening caused by the diffraction of the component light 20$d$, part of the component light 20$d$ passes through the outside of the wavelength restriction element 25 if the wavelength restriction element 25 is downsized too much. Moreover, as the wavelength restriction element 25 becomes smaller, higher precision is needed to arrange the wavelength restriction element 25, and the detecting device 20 encounters difficulty in offering stable performance. Accordingly, it is preferable that a wavelength restriction element 25, which is large to some extent, is used in a region through which the component light 20$d$ of the excitation wavelength transmits. This point is different from the configuration using a conventional light-shielding plate, which cannot be increased in size and demands high arrangement precision. The reason why the light-shielding plate cannot be increased in size is that a lot more quantity of component light of a fluorescence wavelength is shielded if the plate is increased more than necessary.

Additionally, if the wavelength restriction element 25 is arranged on a substrate 24 that is sufficiently large compared with the region through which the component light 20$d$ of the excitation wavelength passes, the influence of the diffraction is restricted. Accordingly, the configuration of arranging the wavelength restriction element 25 on the substrate 24 as illustrated in FIG. 2A is preferable.

[2] is discussed next.

As described above, in the detecting device 20, the wavelength restriction element 25 may be arranged in the region to which part of the dispersed light 20$b$ including the component light 20$d$ of the excitation wavelength is incident. Moreover, the relationship between the region on the plane S1 and a wavelength of light that can be incident to the region is known. Therefore, if the arrangement and the size of the wavelength restriction element 25 are determined, also a wavelength range (hereinafter referred to as an incident wavelength range) of light that can be incident to the wavelength restriction element 25 is determined.

Accordingly, in the detecting device 20, a wavelength range (hereinafter referred to as a design wavelength range), for which the transmittance characteristic of the wavelength restriction element 25 is to be designed, can be restricted to an approximate incident wavelength range. Namely, a conventional wavelength restriction element is designed by targeting the entire visible light range (400 nm to 700 nm) having a width of approximately 300 nm. In contrast, the wavelength restriction element 25 of the detecting device 20 may be designed by targeting an incident wavelength range that is a narrower wavelength range including an excitation wavelength (particular wavelength).

As described above, in the detecting device 20, the design condition of the wavelength restriction element 25 is eased compared with the conventional technique. As a result, the degree of difficulty in designing a wavelength restriction element having a desired transmittance characteristic is reduced. Accordingly, it becomes possible to design the wavelength restriction element 25 having a steep transmittance such that a transmittance of a particular wavelength is extremely low and transmittances of other wavelength ranges are extremely high.

In the detecting device 20, it is preferable to design the wavelength restriction element 25 by targeting a wavelength range, which is wide to some extent, for the incident wavelength range. In this case, considering that the size of the wavelength restriction element 25 is large to some extent for a region through which the component light 20$d$ of the excitation wavelength passes, the detecting device 20 can permit, to some extent, an arrangement error of the wavelength restriction element 25, which causes the incident wavelength range to fluctuate. Accordingly, the detecting device 20 can reject the excitation light with stable performance.

Based on the above discussions [1] and [2], the detecting device 20 can sufficiently reject the excitation light (the component light 20$d$ of the excitation wavelength) with the wavelength restriction element 25.

Preferable transmittance characteristics of the wavelength restriction element 25 are specifically described below.

Figure 3A:
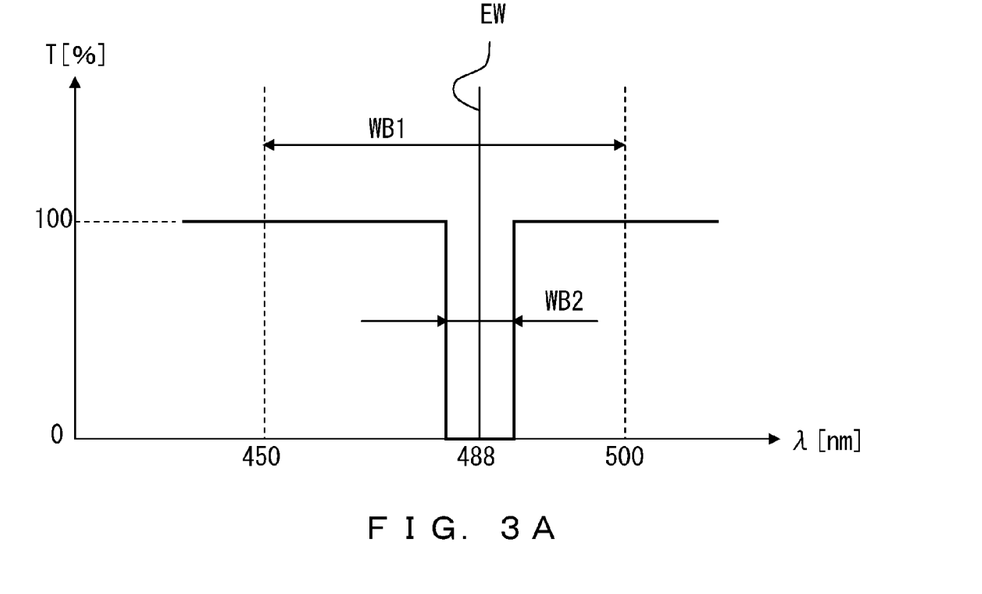
FIG. 3A is a schematic diagram illustrating a transmittance characteristic of a wavelength restriction element in the first embodiment.
Figure 3B:
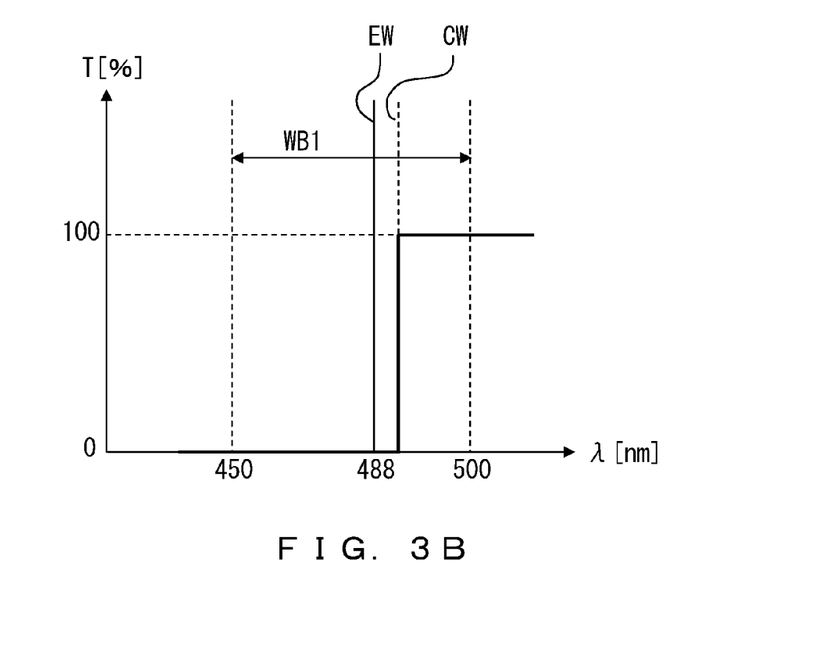
FIG. 3B is a schematic diagram illustrating another transmittance characteristic of the wavelength restriction element in the first embodiment.

FIGS. 3A and 3B are schematic diagrams illustrating the transmittance characteristics of the wavelength restriction element included in the detecting device according to this embodiment. FIGS. 3A and 3B illustrate the preferable transmittance characteristics of the wavelength restriction element 25 if an excitation wavelength EW of excitation light used is 488 nm. The wavelength restriction element 25 is arranged in a region to which light of a wavelength range (incident wavelength range WB1) from 450 nm to 500 nm is incident, and the wavelength restriction element 25 is designed so that its particular wavelength matches the excitation wavelength EW. Vertical and horizontal axes represent a transmittance T [%] and a wavelength [nm], respectively.

The wavelength restriction element 25 illustrated in FIG. 3A is a so-called notch filter. The notch filter is an optical filter having a steep transmittance characteristic that strongly attenuates a particular wavelength. Here, the notch filter where the transmittance of the excitation wavelength EW is 0 percent and the transmittance of the incident wavelength range WB1 is 100 percent except for the excitation wavelength EW (strictly, a narrow wavelength range WB2 including the excitation wavelength EW. Hereinafter referred to as a notch wavelength range) is illustrated. Moreover, a central wavelength of the notch filter and the excitation wavelength EW match. By using the wavelength restriction element 25 having such a transmittance characteristic, excitation light can be sufficiently rejected without shielding fluorescence light.

Note that the transmittance of the excitation wavelength EW is not limited to 0 percent. It is preferable that the transmittance of the excitation wavelength EW is as low as possible. More specifically, it is preferable that an optical density of the wavelength restriction element 25 for the excitation wavelength EW (particular wavelength) is equal to or more than 5.

Additionally, the transmittance of the incident wavelength range WB1 except for the excitation wavelength EW is not limited to 100 percent. However, it is preferable that the transmittance is as high as possible. It is also preferable that the notch wavelength range WB2 is as narrow as possible without being influenced by the widening caused by the diffraction of component light of the excitation wavelength EW. This is because an influence exerted on light, such as fluorescence light or the like, which has a wavelength different from excitation light is reduced.

Furthermore, it is preferable that the transmittance is high in a wavelength range wider than the incident wavelength range WB1. With the high transmittance on the wider wavelength range, performance dependent on the arrangement precision of the wavelength restriction element 25 can be prevented from being degraded, and stable performance of the detecting device 20 can be implemented.

Still further, it is preferable that the width of the wavelength range (the width of the incident wavelength range WB1) that can be incident to the wavelength restriction element 25 is equal to or less than 100 nm, more preferably, equal to or less than 50 nm. If the incident wavelength range WB1 is narrow, also a design wavelength range becomes narrow, and an implementation of a more preferable wavelength characteristic is facilitated.

The wavelength restriction element 25 having a characteristic illustrated in FIG. 3B is a so-called long wavelength pass filter. The long wavelength pass filter is an optical filter that attenuates a short wavelength side and transmits a long wavelength side. Here, the long wavelength pass filter where the transmittance of the excitation wavelength EW is 0 percent and the transmittance of the longer wavelength side than the excitation wavelength EW (strictly, a cutoff wavelength CW slightly longer than the excitation wavelength EW) in the incident wavelength range WB1 is 100 percent is illustrated. Considering that the fluorescence wavelength is longer than the excitation wavelength EW, excitation light can be sufficiently rejected without shielding fluorescence light by using the wavelength restriction element 25 having such a transmittance characteristic.

Note that the transmittance of the excitation wavelength EW is not limited to 0 percent. It is preferable that the transmittance of the excitation wavelength EW is as low as possible. More specifically, it is preferable that an optical density of the wavelength restriction element 25 for the excitation wavelength EW (particular wavelength) is equal to or more than 5.

Additionally, it is preferable that the transmittance of the longer wavelength side than the excitation wavelength EW in the incident wavelength range WB1 is as high as possible although it is not limited to 100 percent. It is also preferable that the cutoff wavelength CW is as close to the excitation wavelength EW as possible and in no relation to the widening caused by the diffraction of the component light of the excitation wavelength EW. This is because an influence exerted on light, such as fluorescence light, having a different wavelength from the excitation light is reduced.

Furthermore, it is preferable that even an outside of the incident wavelength range WB1 has a high transmittance on the longer wavelength side than the excitation wavelength EW. This is because performance dependent on the arrangement precision of the wavelength restriction element 25 is prevented from being degraded, and stable performance of the detecting device 20 can be implemented.

Still further, it is preferable that a width of a wavelength range (the width of the incident wavelength range WB1) that can be incident to the wavelength restriction element 25 is equal to or less than 100 nm, more preferably, equal to or less than 50 nm. If the incident wavelength range WB1 is narrow, also a design wavelength range becomes narrow, and an implementation of a more preferable wavelength characteristic is facilitated.

Figure 4:
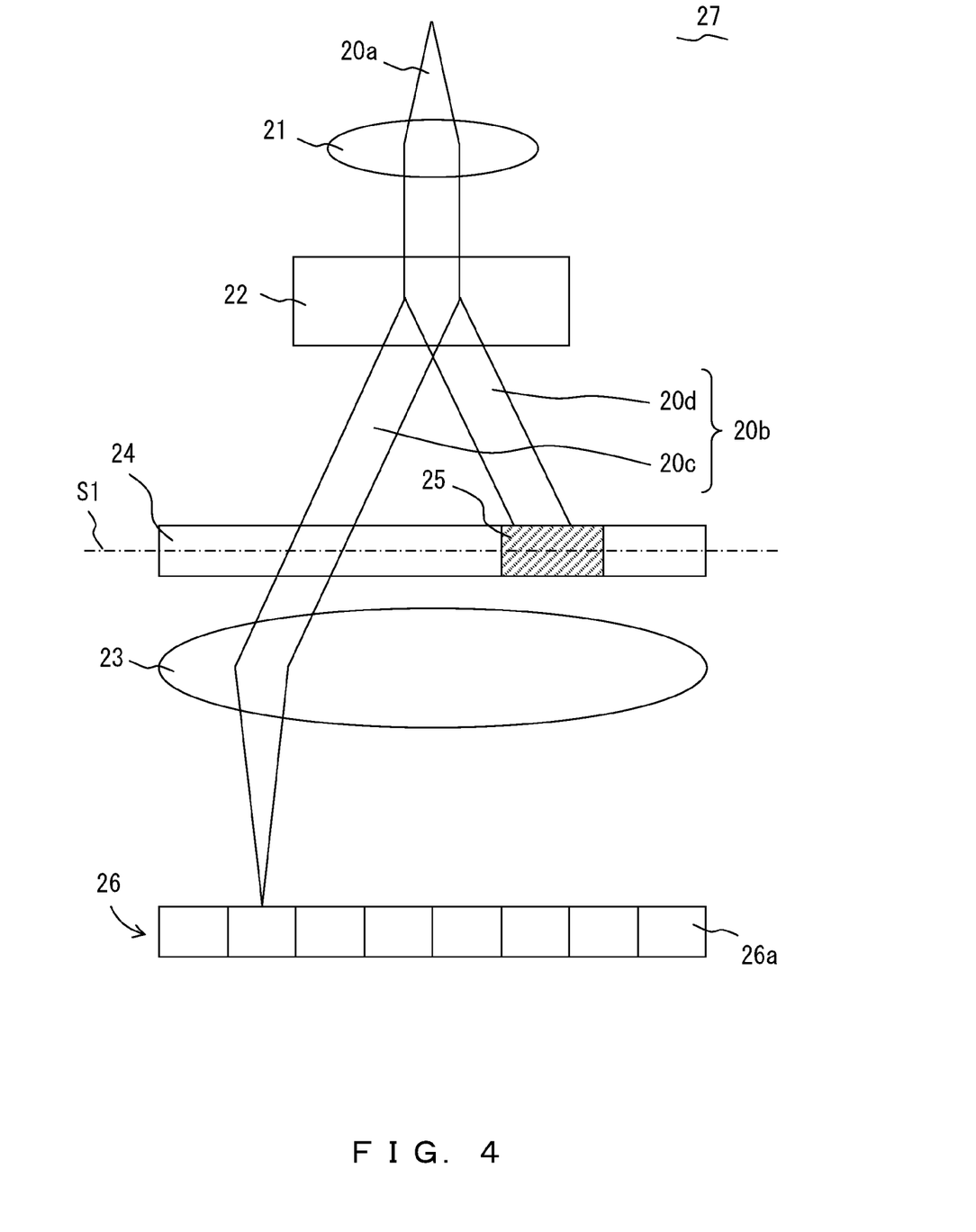
FIG. 4 is a schematic diagram illustrating a modification example of the configuration of the detecting device according to the first embodiment.

FIG. 4 is a schematic diagram illustrating a modification example of the configuration of the detecting device according to this embodiment. The detecting device 27 illustrated in FIG. 4 is similar to the detecting device 20 except for the arrangement of the substrate 24 and the wavelength restriction element 25, which function as a wavelength restriction unit. More specifically, the substrate 24 and the wavelength restriction element 25 are arranged between the collective lens 23 and the photodetector 26 in the detecting device 20 illustrated in FIG. 2A. In contrast, the substrate 24 and the wavelength restriction element 25 are arranged between the wavelength dispersion element 22 and the collective lens 23 in the detecting device 27 illustrated in FIG. 4.

As illustrated in FIG. 4, the component light 20*d* of the excitation wavelength is incident to the wavelength restriction element 25 as collimated light if the wavelength restriction element 25 is arranged between the wavelength dispersion element 22 and the collective lens 23. Normally, a characteristic of an optical filter used as the wavelength restriction element 25 varies depending on an incidence angle. However, if the component light 20*d* is collimated light, the entire component light 20*d* is incident to the wavelength restriction element 25 at the same angle. Therefore, the detecting device 27 is preferable in a point that the entire component light 20*d* can be efficiently rejected by designing the wavelength restriction element 25 optimally for the incidence angle.

In the meantime, if the wavelength restriction element 25 is arranged between the collective lens 23 and the photodetector 26 as illustrated in FIG. 2A, the component light 20*d* of the excitation wavelength is incident to the wavelength restriction element 25 as converged light. Especially, if the wavelength restriction element 25 is arranged in the vicinity of an incidence plane of the photodetector 26, the component light 20*d* is incident to the wavelength restriction element 25 in a state where the diameter of a light flux is small and an overlap, caused by diffraction, with component light of a different wavelength is small. Accordingly, the wavelength restriction element 25 can be further downsized. This is preferable in a point that a design wavelength range becomes narrow and an implementation of a desired transmittance characteristic is facilitated.

If the wavelength restriction element 25 illustrated in FIGS. 2A and 4 is an optical filter, the wavelength restriction element 25 may be configured so that an angle of the incidence plane of the optical filter for the component light 20d is changeable. More specifically, it is preferable that the wavelength restriction element 25, which is an optical filter, can rotate about a rotational axis parallel to the paper sheet and the plane S1. As described above, the characteristic of an optical filter varies depending on an incidence angle. More specifically, the transmittance characteristic of an optical filter normally shifts to a short wavelength side with an increase in the incidence angle. Accordingly, the transmittance characteristic of the wavelength restriction element 25 can be adjusted by adjusting the incidence angle with a change in the angle of the incidence plane. Such a change is especially effective to a light source which is semiconductor laser light sources for emitting respective excitation wavelengths that tend to fluctuate.

As described above, the detecting device (detecting devices 20 and 27) according to this embodiment is configured by including the wavelength dispersion element 22 for dispersing the incident light 20a into wavelengths and for emitting the dispersed light 20b, the photodetector 26 for detecting the dispersed light 20b, and the wavelength restriction element 25, which is arranged between the wavelength dispersion element 22 and the photodetector 26 and has an optical characteristic dependent on a wavelength, for restricting an incidence of light having a particular wavelength to the photodetector 26. The detecting device is configured so that part of the dispersed light 20b including light having a particular wavelength is incident to the wavelength restriction element 25.

By configuring the detecting device in this way, a wavelength restriction element 25 having a desired characteristic can be designed with relative ease. Accordingly, the detecting device, and an optical apparatus including the detecting device can prevent the detection quantity of light to be detected from being decreased, and can sufficiently reject light having a particular wavelength with the wavelength restriction element 25. Moreover, the detecting device, and the optical apparatus including the detecting device can prevent performance dependent on the arrangement precision of the wavelength restriction element 25 from being degraded, whereby the detecting device and the optical apparatus can offer stable performance.

As the optical apparatus including the above described detecting device, for example, a microscope for detecting light, such as fluorescence light or scattering light (hereinafter referred to as CARS light) generated with Coherent Anti-Stokes Raman Scattering (CARS), which has a wavelength different from a wavelength of illumination light illuminated on a sample, is preferable.

If the above described detecting device is used in a fluorescence microscope, the photodetector can be prevented from detecting unnecessary excitation light by making the wavelength of the excitation light (illumination light), which is emitted from a laser light source and illuminated on a sample, and a particular wavelength of a wavelength restriction element match.

Additionally, if the above described detecting device is used in a coherent anti-stokes Raman scattering microscope (hereinafter referred to as a CARS microscope) where two types of illumination light beams having different wavelengths are illuminated on a sample, the photodetector can be prevented from detecting the illumination light beams by providing a wavelength restriction element of a particular wavelength that matches the wavelength of illumination light for each of the illumination light beams.

All the above described microscopes are normally configured as a laser scanning microscope, and include a scanning unit for scanning a sample with laser light (illumination light) emitted from a laser light source.

Second Embodiment

Figure 5:
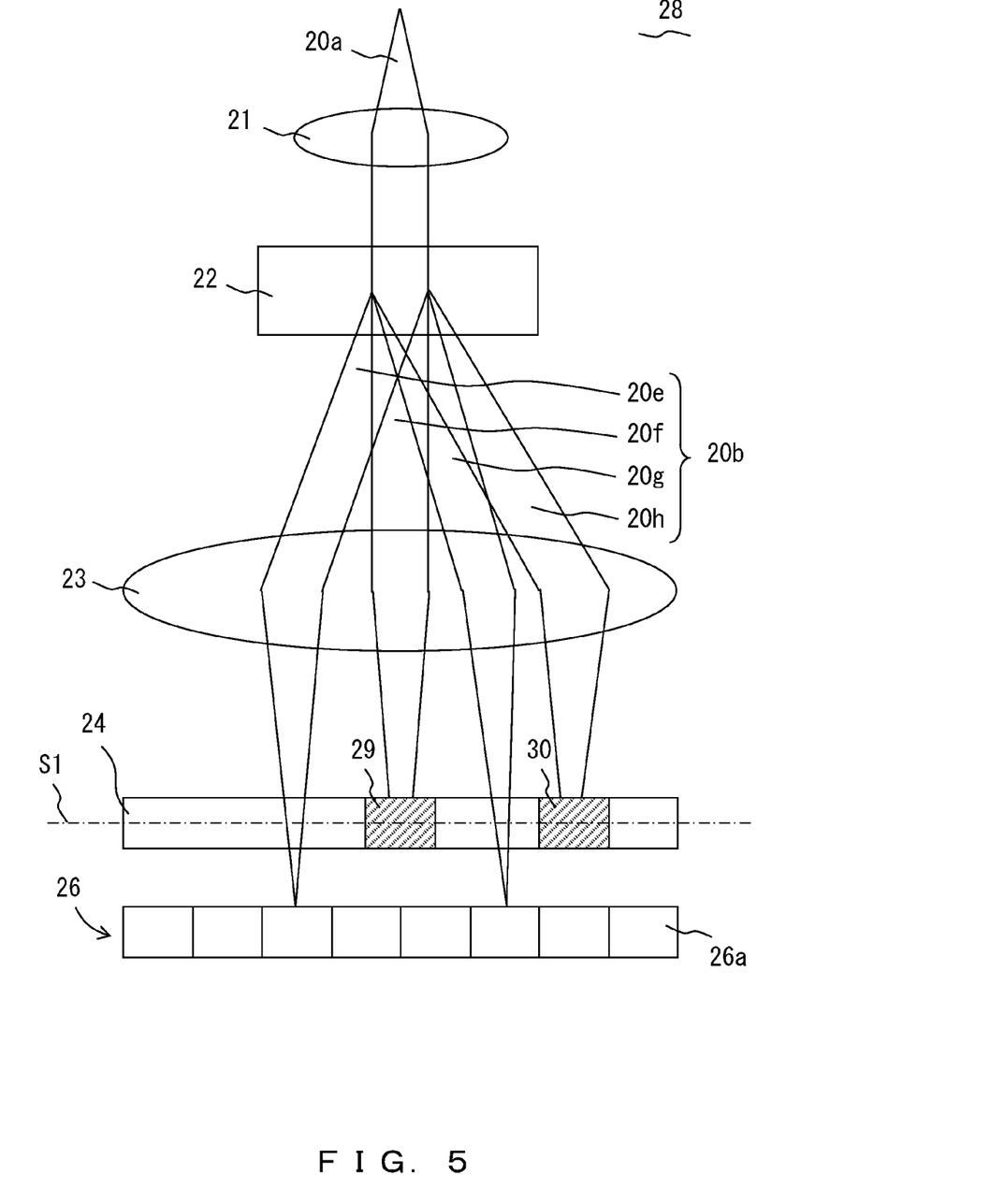
FIG. 5 is a schematic diagram illustrating a configuration of a detecting device according to a second embodiment.

FIG. 5 is a schematic diagram illustrating a configuration of a detecting device according to this embodiment. The detecting device 28 according to this embodiment is different from the detecting device 20 in a point that a plurality of wavelength restriction elements having different particular wavelengths are arranged between the wavelength dispersion element 22 and the photodetector 26 in a wavelength dispersion direction of the dispersed light 20b. The substrate 24, and the plurality of wavelength restriction elements arranged on the substrate 24 function as a wavelength restriction unit for sufficiently restricting an incidence of a plurality of light beams having particular wavelengths (excitation wavelengths) within the dispersed light 20b to the photodetector 26. The optical apparatus according to this embodiment is similar to the optical apparatus 1 except that the optical apparatus is configured by including the detecting device 28 as a replacement for the detecting device 20.

FIG. 5 illustrates a case where two types of laser light sources in the light source 2 are used, and incident light including two types of excitation wavelengths and fluorescence wavelengths included in fluorescence light beams emitted from two types of fluorescent substances is incident to the detecting device. However, the configuration of the optical apparatus is not limited to this one. Namely, three types or more of excitation light beams are used, and incident light including three types or more of excitation light beams and fluorescence wavelengths emitted from three types or more of fluorescent substances may be incident to the detecting device. The fluorescent light beams respectively emitted from the fluorescent substances have a relatively wide wavelength range, and also include a wavelength close to an excitation wavelength.

The incident light 20a that includes fluorescence light and excitation light and is incident to the detecting device 28 is converted into collimated light by the collimating lens 21, and is incident to the wavelength dispersion element 22. The wavelength dispersion element 22 disperses the incident light 20a into wavelengths, and emits dispersed light 20b where component light 20e of a fluorescence wavelength, component light 20f of the excitation wavelength EW1, component light 20g of a fluorescence wavelength, and component light 20h of the excitation wavelength EW2 are arranged in order of the wavelengths. The wavelength dispersion element 22 then makes the emitted light incident to the collective lens 23. The component light beams respectively emitted from the wavelength dispersion element 22 are collimated light beams.

The component light 20e and the component light 20g of the fluorescence wavelengths are respectively converted into converged light beams by the collective lens 23. Thereafter, the component light 20e and the component light 20g respectively transmit through the substrate 24 arranged on the plane S1 between the wavelength dispersion element 22 and the photodetector 26, and are collected on the photodetecting element 26a of the photodetector 26. Since the substrate 24 is transparent to the dispersed light 20b, it is also transparent to the component light 20e and the component light 20g.

Accordingly, the component light beams 20e and 20g are respectively incident to the photodetector 26 without a decrease in their light quantities.

In FIG. 5, only the component light of one wavelength, which represents a wide wavelength region possessed by fluorescence light, is illustrated as the component light 20e of the fluorescence wavelength. Actually, however, the component light 20e of the fluorescence wavelength is distributed up to the vicinity of the component light 20f of the excitation wavelength. Moreover, considering the widening caused by the diffraction of the component light 20e and the component light 20f, part of the component light 20e of the fluorescence wavelength is distributed with an overlap with the component light 20f of the excitation wavelength.

Similarly, also the component light 20g of the fluorescence wavelength is actually distributed up to the vicinity of the component light 20f and the component light 20h of the excitation wavelengths. Moreover, considering the widening caused by the diffraction of the component light beams 20g, 20f and 20h, part of the component light 20g of the fluorescence wavelength is distributed with an overlap with the component light 20f and the component light 20h of the excitation wavelengths.

In the meantime, the component light 20f and the component light 20h of the excitation wavelengths are respectively converted into converged light beams by the collective lens 23. Thereafter, the component light 20f is incident to the wavelength restriction element 29 arranged between the collective lens 23 and the photodetector 26, and the component light 20h is incident to the wavelength restriction element 30 arranged between the collective lens 23 and the photodetector 26. The wavelength restriction element 29 restricts an incidence of the component light 20f of the excitation wavelength EW1 (particular wavelength) to the photodetector 26, whereas the wavelength restriction element 30 restricts an incidence of the component light 20h of the excitation wavelength EW2 (particular wavelength) to the photodetector 26. Accordingly, almost none of the component light 20f of the excitation wavelength EW1 (particular wavelength of the wavelength restriction element 29), and the component light 20h of the excitation wavelength EW2 (the particular wavelength of the wavelength restriction element 30) are incident to the photodetector 26. Therefore, the component light 20f and the component light 20h are rejected.

Also part of the component light 20e of the fluorescence wavelength distributed with the overlap with the component light 20f of the excitation wavelengths is incident to the wavelength restriction element 29. Similarly, also part of the component light 20g of the fluorescence wavelength distributed with the overlap with the component light 20f and the component light 20h of the excitation wavelength is incident to the wavelength restriction elements 29 and 30. However, since the fluorescence wavelengths is different from the excitation wavelength, a transmission of part of the component light beams (the component light 20e and the component light 20g) of the fluorescence wavelength is not restricted when they are incident to the wavelength restriction elements 29 and 30, and the component light beams are incident to the photodetector 26 with almost no decrease in their light quantities.

Note that the wavelength restriction elements 29 and 30 do not need to be arranged in the entire region to which the dispersed light 20b is incident. They may be arranged in a region to which part of the dispersed light 20b including light beams having particular wavelengths is incident. Namely, the wavelength restriction elements 29 and 30 may be arranged in different regions, and may be respectively arranged in a region to which the component light 20f of the excitation wavelength EW1 is incident, and a region to which the component light 20h of the excitation wavelength EW2 is incident.

Additionally, it is preferable that the size of the wavelength restriction elements 29 and 30 is large to some extent for the region to which the component light 20f of the excitation wavelength EW1 is incident, and the region to which the component light 20h of the excitation wavelength EW2 is incident.

Furthermore, the wavelength ranges (incident wavelength ranges) of light respectively incident to the wavelength restriction elements 29 and 30 are respectively determined according to the arrangement and the size of the wavelength restriction elements 29 and 30. Accordingly, the wavelength restriction elements 29 and 30 may be respectively designed by targeting the incident wavelength range. More preferably, the wavelength restriction elements 29 and 30 may be respectively designed by targeting a wavelength range wide to some extent for the incident wavelength ranges. Since the wavelength restriction elements 29 and 30 are arranged at different positions, their incident wavelength ranges are different.

Preferable transmittance characteristics of the wavelength restriction elements 29 and 30 are specifically described below.

Figure 6A:
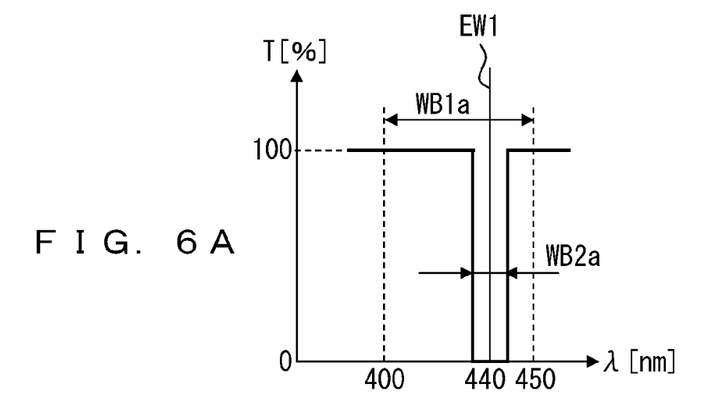
FIG. 6A is a schematic diagram illustrating a transmittance characteristic of a wavelength restriction element in the second embodiment.
Figure 6B:
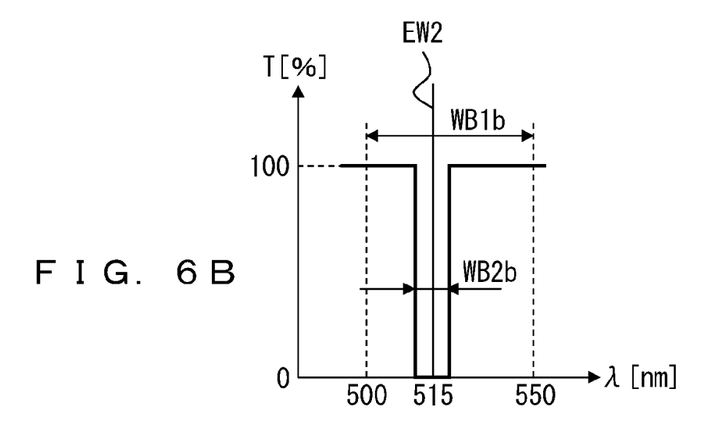
FIG. 6B is a schematic diagram illustrating another transmittance characteristic of the wavelength restriction element in the second embodiment.

FIGS. 6A, 6B and 6C are schematic diagrams illustrating characteristics of the wavelength restriction elements included in the detecting device according to this embodiment. FIG. 6A illustrates the transmittance characteristic of the wavelength restriction element 29 when the excitation wavelength EW1 of excitation light used is 440 nm, whereas FIG. 6B illustrates the transmittance characteristic of the wavelength restriction element 30 when the excitation wavelength EW2 of excitation light used is 515 nm. The wavelength restriction element 29 illustrated in FIG. 6A is arranged in a region to which light having a wavelength range (incident wavelength range WB1a) from 400 nm to 450 nm is incident, and the wavelength restriction element 29 is designed so that its particular wavelength matches the excitation wavelength EW1. Moreover, the wavelength restriction element 30 illustrated in FIG. 6B is arranged in a region to which light having a wavelength range (incident wavelength range WB1b) from 500 nm to 550 nm is incident, and the wavelength restriction element 30 is designed so that its particular wavelength matches the excitation wavelength EW2. Vertical and horizontal axes represent a transmittance T [%] and a wavelength [nm], respectively.

The wavelength restriction element 29 having the characteristic illustrated in FIG. 6A is a so-called notch filter. Here, the notch filter where the transmittance of the excitation wavelength EW1 is 0 percent and that of the incident wavelength range WB1a is 100 percent except for the excitation wavelength EW1 (strictly, a narrow wavelength range WB2a including the excitation wavelength EW1. Hereinafter referred to as a notch wavelength range) is illustrated. Moreover, a central wavelength of the notch filter and the excitation wavelength EW1 match.

Also the wavelength restriction element 30 having the characteristic illustrated in FIG. 6B is a so-called notch filter. Here, the notch filter where the transmittance of the excitation wavelength EW2 is 0 percent and that of the incident wavelength range WB1b is 100 percent except for the excitation wavelength EW2 (strictly, a narrow wavelength range WB2b including the excitation wavelength EW2. Hereinafter referred to as a notch wavelength range) is illustrated.

By using the wavelength restriction elements 29 and 30 having such transmittance characteristics, excitation light can be sufficiently rejected without shielding fluorescence light.

For a reason similar to the first embodiment, it is preferable that the transmittances of the excitation wavelengths (excitation wavelengths EW1 and EW2) are as low as possible and an optical density for the excitation wavelengths is equal to or more than 5. It is also preferable that the notch wavelength ranges (notch wavelength ranges WB2a and WB2b) are as narrow as possible without being influenced by the widening caused by the diffraction of the component light of the excitation wavelengths. It is further preferable that a transmittance is high in a wavelength range wider than the incident wavelength ranges (incident wavelength ranges WB1a and WB1b). It is still further preferable that the width of the incident wavelength ranges is equal to or less than 100 nm, more preferably, equal to or less than 50 nm.

Figure 6C:
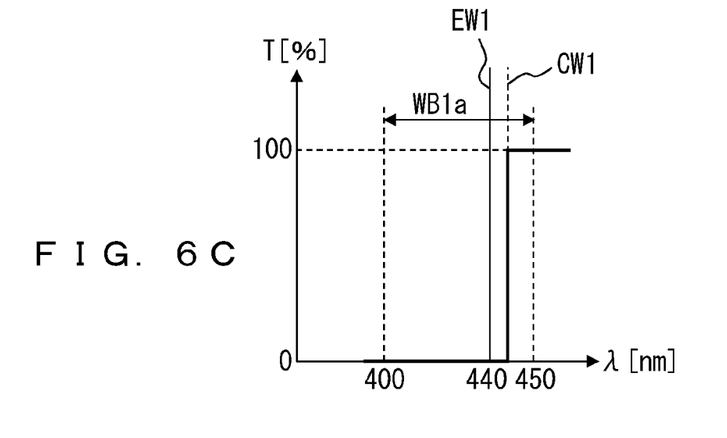
FIG. 6C is a schematic diagram illustrating a further transmittance characteristic of the wavelength restriction element in the second embodiment.

The wavelength restriction element 29 having a particular wavelength that matches light having the shortest excitation wavelength among the plurality of wavelength restriction elements may be not the notch filter illustrated in FIG. 6A but a long wavelength pass filter illustrated in FIG. 6C. Here, the long wavelength pass filter where the transmittance of the excitation wavelength EW1 is 0 percent and that of a longer wavelength side (strictly, a slightly longer cutoff wavelength CW1 than the excitation wavelength EW1) than the excitation wavelength EW1 in the incident wavelength range WB1a is 100 percent is illustrated. Therefore, considering that the excitation wavelength EW1 is the shortest excitation wavelength and a fluorescence wavelength is longer than a excitation wavelength, the excitation light can be sufficiently rejected without shielding the fluorescence light by using the wavelength restriction element 29 having such a transmittance characteristic.

For a reason similar to the first embodiment, it is preferable that the transmittance of the excitation wavelength EW1 is as low as possible and an optical density for the excitation wavelength EW1 is equal to or more than 5. It is also preferable that the cutoff wavelength CW1 is as close to the excitation wavelength EW1 as possible and in no relation to the widening caused by the diffraction of the component light of the excitation wavelength EW1. It is further preferable that an outside of the incident wavelength range WB1a has a high transmittance on the longer wavelength side than the excitation wavelength EW1. It is still further preferable that the width of the incident wavelength range WB1a is equal to or less than 100 nm, more preferably, equal to or less than 50 nm.

As described above, the detecting device 28 according to this embodiment is configured by including the wavelength dispersion element 22 for dispersing the incident light 20a into wavelengths and for emitting the dispersed light 20b, the photodetector 26 for detecting the dispersed light 20b, and the plurality of wavelength restriction elements (wavelength restriction elements 29 and 30), which have an optical characteristic dependent on a wavelength and are arranged between the wavelength dispersion element 22 and the photodetector 26, for restricting an incidence of light having a particular wavelength to the photodetector 26. The detecting device 28 is configured so that part of the dispersed light 20b including light having a particular wavelength is incident to each of the wavelength restriction elements. Here, the plurality of wavelength restriction elements are respectively arranged in different regions. Moreover, the plurality of wavelength restriction elements respectively have different particular wavelengths.

By configuring the detecting device 28 in this way, a plurality of wavelength restriction elements respectively having desired characteristics can be designed with relative ease. Accordingly, the detecting device 28, and an optical apparatus including the detecting device 28 can prevent the detection quantity of light to be detected from being decreased and can sufficiently reject light having a particular wavelength with each wavelength restriction element. Moreover, performance dependent on the arrangement precision of each wavelength restriction element can be prevented from being degraded, whereby the detecting device 28 can offer stable performance.

Also in this embodiment, the substrate 24 and the plurality of wavelength restriction elements may be arranged between the wavelength dispersion element 22 and the collective lens 23 as illustrated in FIG. 4. Moreover, if each wavelength restriction element is an optical filter, it may be configured so that an angle on the incidence plane of the optical filter for incident light is changeable. Specifically, it is preferable that each wavelength restriction element, which is an optical filter, can rotate about a rotational axis parallel to the paper sheet of FIG. 5 and the plane S1. It is further preferable that each wavelength restriction element can rotate independently.

Additionally, each wavelength restriction element on the substrate 24 may be arranged to be insertable/removable in/from an optical path of the dispersed light 20b. As a result, only a wavelength restriction element needed according to a wavelength of excitation light used can be arranged on the substrate 24.

Figure 7:
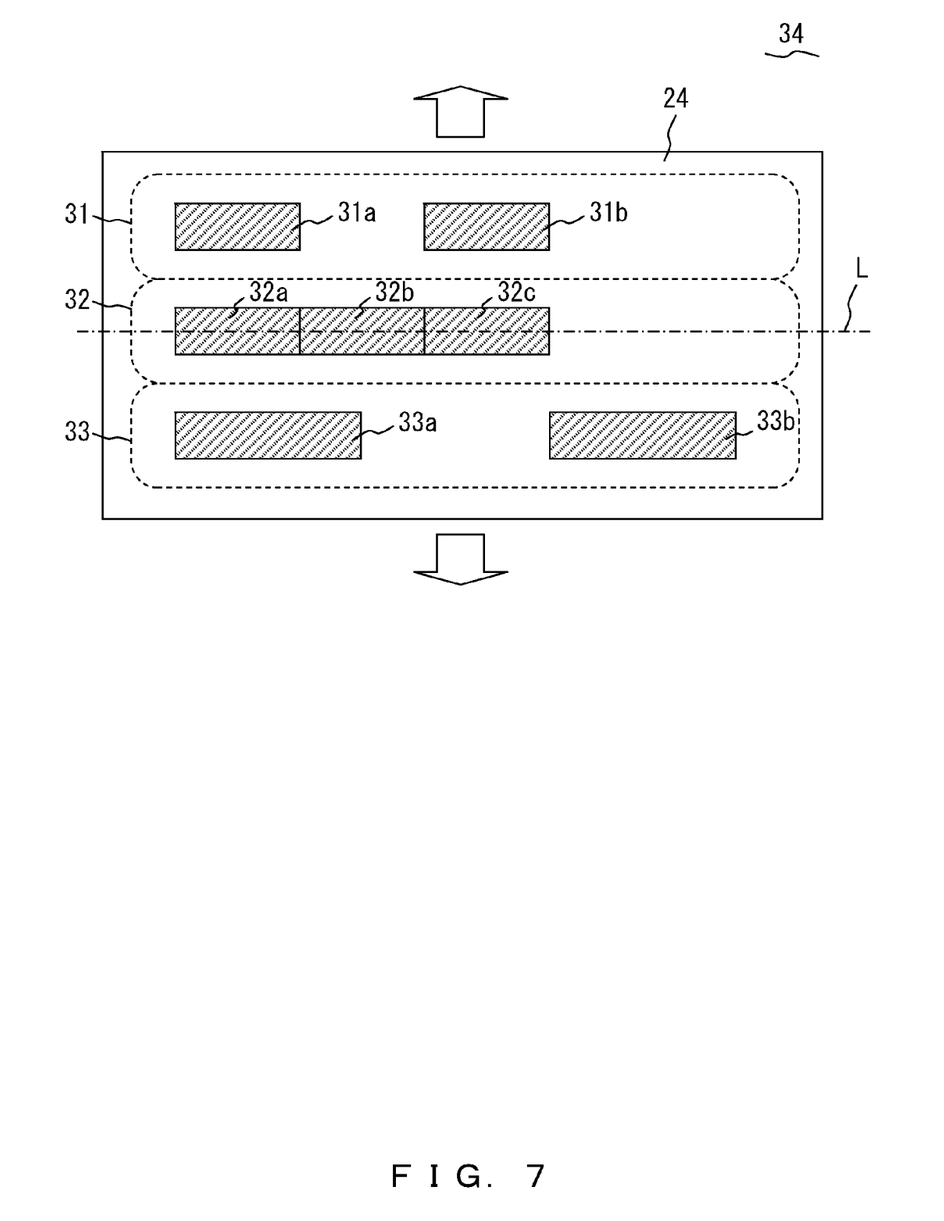
FIG. 7 illustrates a modification example of a configuration of a wavelength restriction device in the second embodiment.

FIG. 7 illustrates a modification example of the configuration of a wavelength restriction device in this embodiment. This figure is a cross-sectional view of the wavelength restriction device on the plane S1 between the wavelength dispersion element 22 and the photodetector 26. The wavelength restriction device 34 illustrated in FIG. 7 is configured by including a plurality of wavelength restriction units (wavelength restriction units 31, 32 and 33) arranged to be insertable/removable in/from the optical path of the dispersed light 20b, and a transparent substrate 24 that transmits the dispersed light 20b. A linear line L represents a position through which the dispersed light 20b passes.

Each of the wavelength restriction units (wavelength restriction units 31, 32 and 33) is configured by including a plurality of wavelength restriction elements of different particular wavelengths. Namely, the plurality of wavelength restriction elements included in the same wavelength restriction unit respectively restrict an incidence of light beams respectively having different particular wavelengths to the photodetector 26. Moreover, the plurality of wavelength restriction elements included in the same wavelength restriction unit are arranged in regions to which light beams having different wavelength ranges (incident wavelength ranges) are incident. Furthermore, the plurality of wavelength restriction elements included in the same wavelength restriction unit are arranged in a certain direction, and are arranged so that the direction matches the wavelength dispersion direction of the dispersed light 20b in a state where the wavelength restriction unit is inserted in the optical path of the dispersed light 20b. All the wavelength restriction units are arranged on the substrate 24.

In the wavelength restriction device 34, a wavelength restriction unit to be inserted in the optical path of the dispersed light can be switched 34 by driving the substrate 24 in a direction vertical to the linear line L on the plane S1.

Accordingly, by preparing wavelength restriction units for respectively expected usage environments and by switching among the wavelength restriction units according to a usage environment, the wavelength restriction device 34 can reject light having an arbitrary excitation wavelength according to the usage environment. Moreover, in the detecting device including the wavelength restriction device 34, wavelength restriction elements can be replaced in units of wavelength restriction units. Therefore, this detecting device can quickly cope with a change in a usage environment compared with the detecting device 28 where wavelength restriction elements are individually replaced. For example, wavelength restriction units may be also switched in synchronization with switching among light sources for emitting excitation light or switching among wavelength dispersion elements.

Here, the usage environment is an environment determined, for example, according to wavelengths or the number of excitation light beams illuminated on a sample, or according to the resolution of the photodetector 26. The resolution of the photodetector 26 depends on the number of photodetecting elements 26a and a wavelength range of light incident to the photodetector 26. The resolution of the photodetector 26 increases with a decrease in the width of the wavelength range of light incident to each photodetecting element 26a.

One example of a plurality of wavelength restriction units the usage environments of which are different is described below.

The wavelength restriction unit 31 includes a wavelength restriction element 31a of a particular wavelength of 440 nm, and a wavelength restriction element 31b of a particular wavelength of 515 nm. The wavelength restriction unit 32 includes a wavelength restriction element 32a of a particular wavelength of 440 nm, a wavelength restriction element 32b of a particular wavelength of 488 nm, and a wavelength restriction element 32c of a particular wavelength of 515 nm. The wavelength restriction unit 33 includes a wavelength restriction element 33a of a particular wavelength of 440 nm, and a wavelength restriction element 33b of a particular wavelength of 515 nm. In the wavelength restriction units 31 and 33, distances between the wavelength restriction elements are different.

In this case, the wavelength restriction unit 32 is used under a usage environment where wavelengths and the number of excitation light beams illuminated on a sample are different from those in the usage environment of the wavelength restriction unit 31. Moreover, the wavelength restriction unit 33 is used in a usage environment where the resolution of the photodetector 26 is different from that in the usage environment of the wavelength restriction unit 31.

Figure 8:
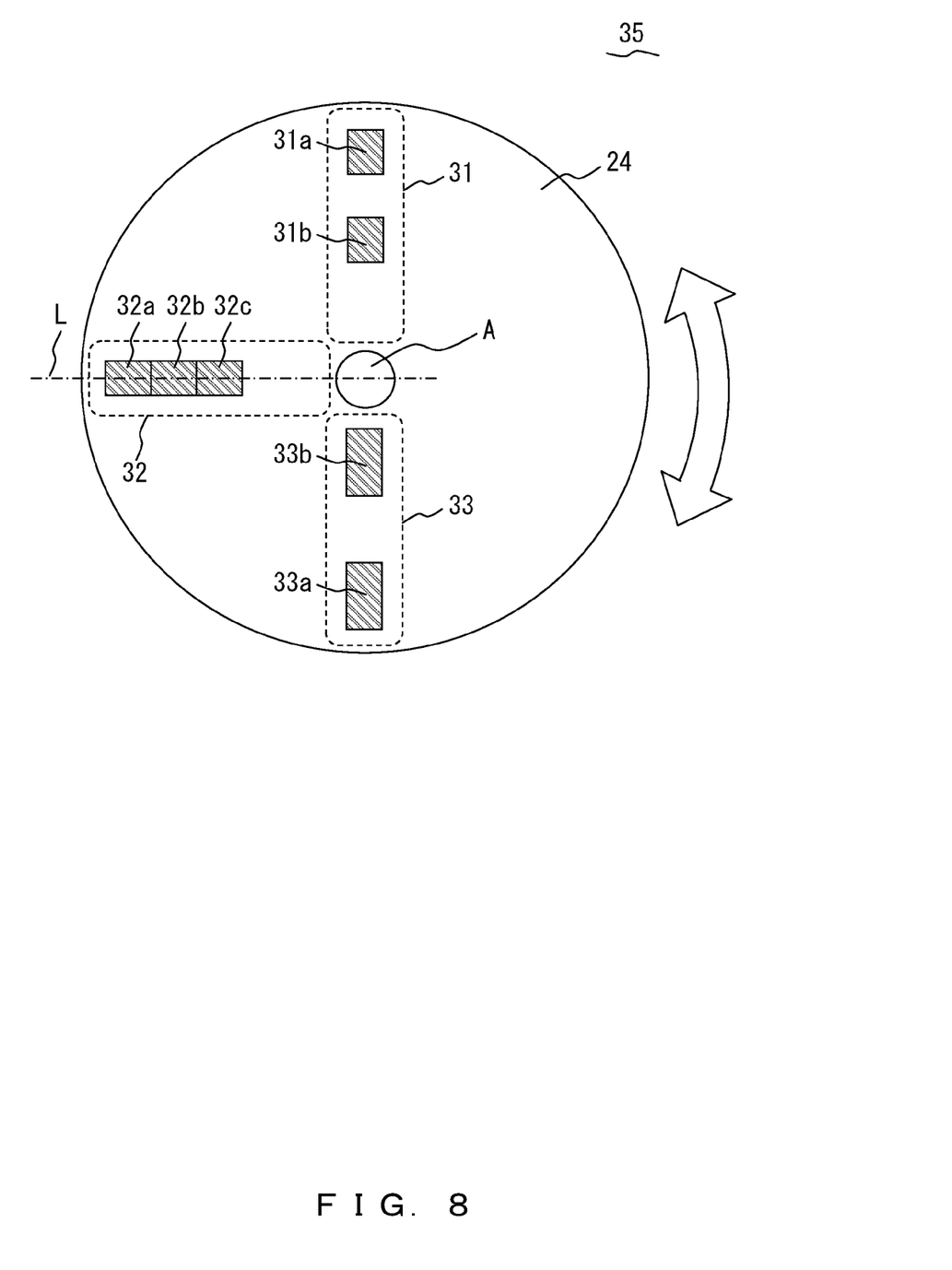
FIG. 8 illustrates another modification example of the configuration of the wavelength restriction device in the second embodiment.

FIG. 8 illustrates another modification example of the configuration of the wavelength restriction device according to this embodiment. This is a cross-sectional view of a wavelength restriction device on the plane S1. The wavelength restriction device 35 illustrated in FIG. 8 is different from the wavelength restriction device 34 only in a point that a wavelength restriction unit to be inserted in the optical path of the dispersed light 20b is switched by rotating the substrate 24 about a rotational axis A on the plane S1.

Accordingly, also with the wavelength restriction device 35, effects similar to the wavelength restriction device 34 can be obtained by preparing wavelength restriction units for respectively expected usage environments and by switching among the wavelength restriction units according to a usage environment.

What is claimed is:

1. A detecting device for fluorescence observation, the detecting device comprising:
a wavelength dispersion element for dispersing light into wavelengths, and for emitting dispersed light, the dispersed light including component light having an excitation wavelength and component light having a fluorescence wavelength;
a photodetector for detecting the dispersed light, the photodetector being arranged in a wavelength dispersion direction of the dispersed light; and
a wavelength restriction element, which is arranged between the wavelength dispersion element and the photodetector and has an optical characteristic dependent on a wavelength, for restricting an incidence to the photodetector of the component light having the excitation wavelength which is included in the dispersed light, the optical characteristic of the wavelength restriction element being such that, when the dispersed light emitted by the wavelength dispersing element is incident to the wavelength restriction element, the component light having the excitation wavelength is restricted, and the component light having the fluorescence wavelength is transmitted through the wavelength restriction element, wherein the wavelength restriction element is arranged in a spatial region to which the component light having the excitation wavelength is incident, and the wavelength restriction element has a width in the wavelength dispersion direction greater than a width in the wavelength dispersion direction of the component light having the excitation wavelength in a plane corresponding to an incidence plane of the wavelength restriction element, and smaller than a total width in the wavelength dispersion direction of the dispersed light in said plane.

2. The detecting device according to claim 1, wherein the photodetector includes a plurality of photodetecting elements, and the plurality of photodetecting elements are arranged in the wavelength dispersion direction of the dispersed light.

3. The detecting device according to claim 1, wherein the wavelength restriction element is an optical filter, which has a transmittance dependent on a wavelength, for attenuating the component light having the excitation wavelength.

4. The detecting device according to claim 3, wherein a width of a wavelength range of light that is incident to the optical filter is equal to or less than 100 nm.

5. The detecting device according to claim 4, wherein an optical density of the optical filter for the excitation wavelength is equal to or more than 5.

6. The detecting device according to claim 3, wherein the optical filter is a notch filter having a steep transmittance characteristic.

7. The detecting device according to claim 6, wherein a central wavelength of the notch filter matches the excitation wavelength.

8. The detecting device according to claim 3, wherein the optical filter is configured so that an angle of the incidence plane of the optical filter for the light having the excitation wavelength is changeable.

9. The detecting device according to claim 3, wherein the optical filter is a long pass filter.

10. The detecting device according to claim 1, further comprising a transparent substrate, arranged between the wavelength dispersion element and the photodetector, for transmitting the dispersed light,
wherein the wavelength restriction element is arranged on the substrate.

11. The detecting device according to claim 1, wherein:
the wavelength restriction element comprises a plurality of wavelength restriction elements each having an optical characteristic dependent on a wavelength, the wavelengths on which the respective optical characteristics depend being different from each other,
the plurality of wavelength restriction elements are arranged between the wavelength dispersion element and the photodetector, and
the plurality of wavelength restriction elements are respectively arranged in different regions.

12. The detecting device according to claim 11, wherein the plurality of wavelength restriction elements are arranged in a wavelength dispersion direction of the dispersed light.

13. The detecting device according to claim 11, wherein each of the plurality of wavelength restriction elements is arranged to be insertable in and removable from an optical path of the dispersed light.

14. The detecting device according to claim 1, further comprising a plurality of wavelength restriction units that are arranged, between the wavelength dispersion element and the photodetector, to be insertable in and removable from an optical path of the dispersed light,
wherein the wavelength restriction element comprises a plurality of wavelength restriction elements each having an optical characteristic dependent on a wavelength, the wavelengths on which the respective optical characteristics depend being different from each other,
wherein each of the plurality of wavelength restriction units includes plural wavelength restriction elements from among the plurality of wavelength restriction elements, and the plural wavelength restriction elements included in a same wavelength restriction unit are respectively arranged in different regions.

15. The detecting device according to claim 14, wherein the plural wavelength restriction elements included in the same wavelength restriction unit are arranged in a certain direction, and the plural wavelength restriction elements included in the wavelength restriction unit inserted in the optical path of the dispersed light are arranged in a wavelength dispersion direction of the dispersed light.

16. The detecting device according to claim 15, further comprising a transparent substrate, arranged between the wavelength dispersion element and the photodetector, for transmitting the dispersed light, wherein the plurality of wavelength restriction units are arranged on the substrate.

17. The detecting device according to claim 16, wherein the wavelength restriction unit to be inserted in the optical path of the dispersed light is switched by driving the substrate.

18. The detecting device according to claim 17, wherein the wavelength restriction unit to be inserted in the optical path of the dispersed light is switched by rotating the substrate.

19. An optical apparatus, comprising:
a light source for illuminating a sample; and
the detecting device according to claim 1 for detecting light emitted from the sample,
wherein a wavelength of illumination light illuminated on the sample matches the excitation wavelength.

20. The optical apparatus according to claim 19, further comprising a scanning unit for scanning the sample with the illumination light,
wherein the light source is a laser light source, and the optical apparatus is a laser scanning microscope.

21. The optical apparatus according to claim 20, wherein the laser scanning microscope is a fluorescence microscope.

* * * * *